United States Patent [19]

Mori

[11] Patent Number: 4,495,408

[45] Date of Patent: Jan. 22, 1985

[54] SUNLIGHT DIRECTION SENSOR

[76] Inventor: Kei Mori, 3-16-3-501, Kaminoge, Setagaya-ku, Tokyo, Japan

[21] Appl. No.: 376,235

[22] Filed: May 7, 1982

[30] Foreign Application Priority Data

May 9, 1981 [JP] Japan ................. 56-69781
Jun. 26, 1981 [JP] Japan ................. 56-99993
Feb. 5, 1982 [JP] Japan ................. 57-17237

[51] Int. Cl.³ ................. G01J 1/20; F24J 3/02
[52] U.S. Cl. ................. 250/203 R; 126/425
[58] Field of Search ........... 250/203 R, 209; 126/425; 356/141, 152

[56] References Cited

U.S. PATENT DOCUMENTS

| | | | |
|---|---|---|---|
| 3,599,001 | 8/1971 | Rolnik et al. | 356/152 |
| 3,783,271 | 1/1974 | Abbott, Jr. et al. | 356/152 |
| 3,996,460 | 12/1976 | Smith | 250/203 R |
| 3,996,917 | 12/1976 | Trihey | 250/203 R |
| 4,003,655 | 1/1977 | Wasilko | 356/152 |
| 4,041,307 | 8/1977 | Napoli et al. | 250/203 R |
| 4,225,781 | 9/1980 | Hammons | 356/141 |
| 4,355,896 | 10/1982 | Laue | 250/203 R |

Primary Examiner—Davis L. Willis
Assistant Examiner—Ernest Austin, II
Attorney, Agent, or Firm—Burgess, Ryan & Wayne

[57] ABSTRACT

Provided is a sunlight direction sensor having a cylindrical body, a nontransparent flange having a diameter smaller than the inner diameter of the cylindrical body, a first photosensor disposed on the flange or substantially at the center of the inner bottom surface of the cylindrical body, and at least one pair of second and third photosensors which are disposed at the inner bottom surface of the cylindrical body and which are arranged symmetrically with respect to the axis of the cylindrical body, inner edges of the second and third photosensors corresponding to the inner periphery of the flange.

8 Claims, 17 Drawing Figures

SUNLIGHT DIRECTION SENSOR

BACKGROUND OF THE INVENTION

1. Field of the Invention

The present invention relates to a sunlight direction sensor for detecting the direction of the sun.

2. Description of the Prior Art

Various studies have recently been made to effectively utilize solar energy in various fields. Solar energy must be effectively collected to utilize it effectively. For this purpose, a solar energy collector device must follow the movement of the sun for optimal results.

Various sunlight direction sensors have been conventionally developed. However, they are not necessarily operated with high performance.

SUMMARY OF THE INVENTION

The present invention has been made in consideration of the above problem and has its object to provide a sunlight direction sensor which is mounted in a solar energy collector device to cause the device to automatically follow the sun.

In order to achieve the above object of the present invention, there is provided a sunlight direction sensor comprising a cylindrical body, a nontransparent flange disposed at an upper end of the cylindrical body and having a circumferential portion whose diameter is smaller than an inner diameter of the cylindrical body, a first photosensor which is arranged on the nontransparent flange or substantially at the center of the lower end of the cylindrical body, and at least one pair of each of second and third photosensors which are symmetrically arranged at the lower end of the cylindrical body, inner edges of the at least one pair of each of the second and third photosensors corresponding to the inner periphery of the flange.

DETAILED DESCRIPTION OF THE PREFERRED EMBODIMENTS

Figures 1, 2, 3, 4:
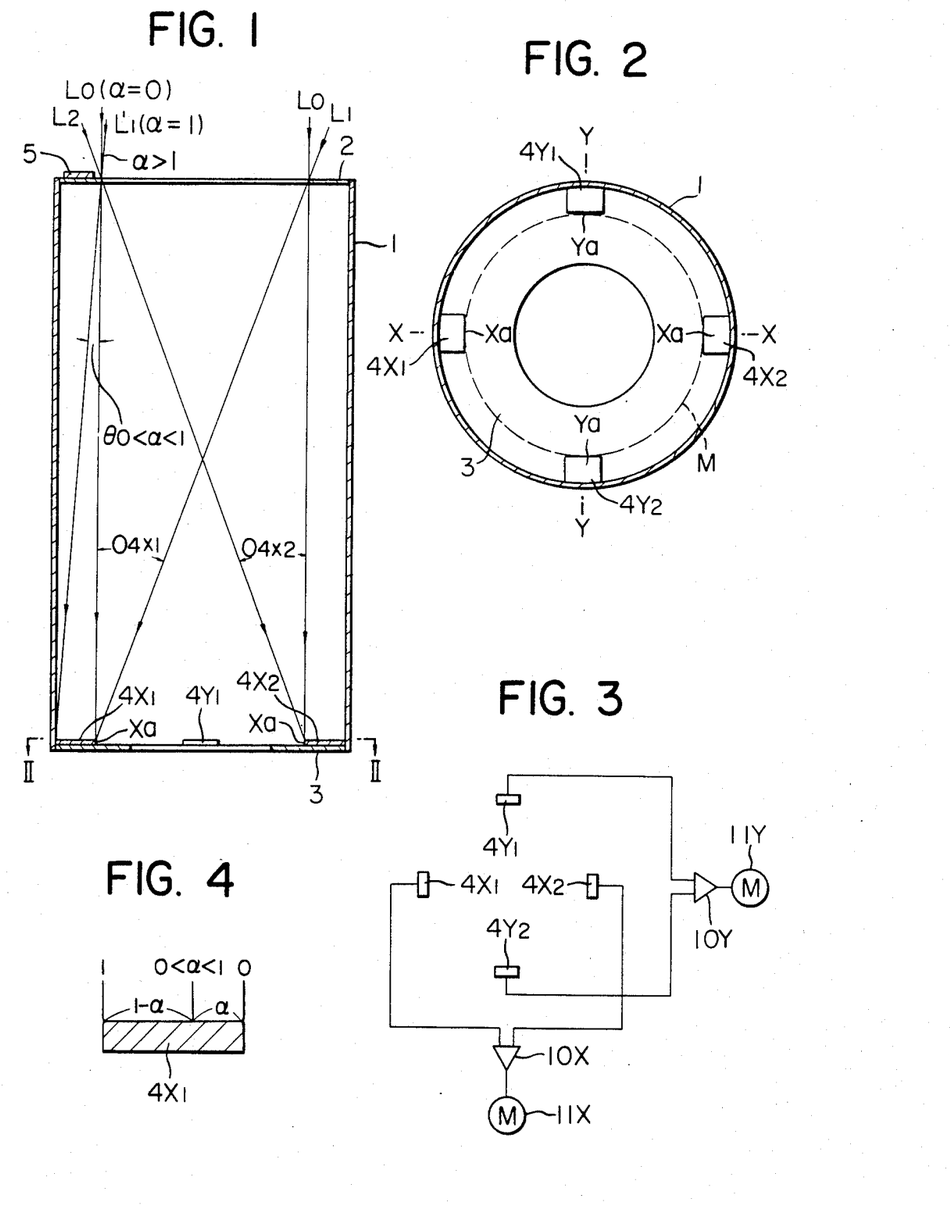
FIG. 1 is a side-sectional view of of a conventional sunlight direction sensor.
FIG. 2 is a sectional view taken along the line II—II in FIG. 1.
FIG. 3 is a circuit diagram of an electrical circuit using the sunlight direction sensor shown in FIG. 1.
FIG. 4 is a view for explaining the mode of operation of the sunlight direction sensor shown in FIG. 1.

FIG. 1 is a side-sectional view of a sunlight direction sensor previously proposed by the same applicant. FIG. 2 is a sectional view taken along the line II—II in FIG. 1. A nontransparent upper flange 2 and a nontransparent lower flange 3 are formed at the top of a nontransparent cylindrical body 1 and at the bottom thereof respectively. At least one pair of photosensors $4X_1$ and $4X_2$ or $4Y_1$ and $4Y_2$ are arranged at equal angular intervals on the upper surface of the flange 3 in such a manner that photosensors $4X_1$ and $4X_2$ are symmetrical with respect to the axis of the cylindrical body 1. The photosensors $4Y_1$ and $4Y_2$ are also symmetrical with respect to the axis. Distances between inner edges Xa and Xa and between inner edges Ya and Ya of the photosensors are the same as the inner diameter of the flange 2. The pairs of photosensors are preferably arranged perpendicularly to each other. When the axis of the cylindrical body 1 is parallel to sunbeams, they are not directly incident on the photosensors $4X_1$, $4X_2$, $4Y_1$ and $4Y_2$. Thus, the photosensors generate an output in accordance with indirectly incident sunbeams. However, when the sunbeams incident in a range of $L_1$ to $L_0$, that is, when the cylindrical body 1 is inclined by an angle $\theta_{4x1}$ with respect to the direction of the incident sunbeams, straight sunbeams are incident only on the photosensor $4X_1$ while they are not incident on the photosensor $4X_2$. However, when the sunbeams are incident in a range of $L_0$ to $L_2$, that is, when the cylindrical body 1 is inclined by an angle $\theta_{4x2}$ with respect to the direction of the incident sunbeams, direct sunbeams are incident only on the photosensor $4X_2$, while they are not incident on the photosensor $4X_1$. As shown in FIG. 3, outputs from the photosensors $4X_1$ and $4X_2$ are compared with each other in a differential amplifier 10X. If a motor 11X is driven to eliminate the difference, the solar energy collector device is rotated about a Y-axis (line connecting the photosensors $4Y_1$ and $4Y_2$) to be directed toward the sun, resulting in optimal conditions for collecting solar energy. If incident sunbeams deviate along the Y-axis, outputs from the photosensors $4Y_1$ and $4Y_2$ are compared with each other in a differential amplifier 10Y and a motor 11Y is driven to eliminate the difference. Therefore, the solar energy collector device is then pivoted about an X-axis (line connecting the photosensors $4X_1$ and $4X_2$) to be directed toward the sun.

A photosensor 5 is arranged on the upper surface of the flange 2 and detects the presence or absence of the sunbeams. Only when the photosensor 5 detects the presence of the sunbeams, the solar energy collector device follows the sun. However, when the sunbeams are not radiated, for example, at night, the solar energy collector device stops following the sun. Referring to FIG. 1, assume that the photosensor 5 is defined as a sensor for detecting the total amount of sunbeams, the sensor $4X_1$ is defined as a sensor for detecting the amount of direct beams from the sun (or a sensor for detecting the amount of indirect beams from the sun), the photosensor $4X_2$ is defined as a sensor for detecting the amount of indirect beams from the sun (or a sensor for detecting the amount of direct beams from the sun when the photosensor $4X_1$ is used as the sensor for detecting the amount of indirect beams from the sun). A total amount S (lux) of sunbeams, an amount D (lux) of direct beams from the sun, and an amount I (lux) of indirect beams from the sun have the following relation:

$$S = D + I \quad (1)$$

When a ratio (D/I) of the amount of direct beams from the sun to the indirect beams from the sun is defined as $\beta$, the following relation is given:

$$S = \beta S + (1 - \beta)S \quad (2)$$

Further, assume that an output signal associated with the total amount S of sunbeams detected by the photosensor 5 is defined as $L_0$ (mV), an output signal associated with the amount D of beams detected by the photosensor $4X_1$ is defined as $L_1$ (mV), and that an output signal associated with the amount I of beams detected by the photosensor $4X_2$ is defined as $L_2$. One edge of the photosensor $4X_1$ or $4X_2$ which is in contact with the outer periphery of the luminous flux in the cylindrical body 1 is defined as 0 and the other edge thereof which is in contact with the inner periphery of the cylindrical body 1 is defined as 1. Further, a ratio of the width of the luminous flux fallen on the photosensor $4X_1$ to that of the photosensor $4X_1$ is defined as $\alpha$. When the sunbeams are fallen in the range of $L_0$ to $L_1$, that is, when $\alpha$ is smaller than 1 and larger than 0, one part of the photosensor $4X_1$ which corresponds to the ratio $\alpha$ is irradiated by the beams directly transmitted from the sun. The other part of the photosensor $4X_1$ which corresponds to the ratio $(1 - \alpha)$ is irradiated by the beams indirectly transmitted from the sun. The photosensor $4X_2$ is only irradiated by the indirect beams from the sun. Therefore, $$L_1 = \alpha \frac{1}{\delta} D + (1 - \alpha) \frac{1}{\delta} I \quad (3)$$

$$L_2 = \frac{1}{\delta} I = \frac{1}{\delta}(1 - \beta)S = (1 - \beta)L_0 \quad (4)$$

where $\delta$ is a conversion coefficient $(S/L_0)$ and $\beta$ is the ratio (D/I). Relation (3) above may be rewritten as follows:

$$L_1 = \frac{1}{\delta}\{\alpha D + (1 - \alpha)I\}$$

$$= \frac{1}{\delta}\{\alpha\beta S + (1 - \alpha)(1 - \beta)S\}$$

$$= \frac{1}{\delta}(\alpha\beta S) + (1 - \alpha)L_2$$

$$= (L_0)\alpha\beta + (1 - \alpha)L_2$$

$$= \alpha\beta L_0 + L_2 - \alpha L_2$$

$$= \alpha(\beta L_0 - L_2) + L_2$$

$$= \alpha(L_0 - 2L_2) + L_2$$

Therefore, $$\alpha = \frac{L_1 - L_2}{L_0 - 2L_2} \quad (5)$$

As is apparent from relation (5), the ratio $\alpha$ is expressed by only the measurable values $L_0$, $L_1$ and $L_2$ and is independent of the ratio $\beta$ and the conversion coefficient $\delta$. If the sunbeams incident on the cylindrical body 1 are within an angular range corresponding to the ratio within the range of $0 < \alpha < 1$, the incident angle of the sunbeams is calculated by only the output signals from the photosensors 5, $4X_1$ and $4X_2$, as shown in relation (5). If values of the output signals in mV are substituted in relation (5), an angle by which the cylindrical body 1 is deviated from the sunbeams can be measured. Then, the cylindrical body 1 is rotated though the measured angle, effectively preventing overhunting by a stepping motor.

If $\alpha > 1$, the control system is operated in the same manner as in the case of $\alpha = 1$, as is apparent from FIG. 4. Therefore, even if it is cloudy and the incident angle is considerably deviated from a predetermined range, the control system functions to achieve $\alpha = 1$ within a short period of time. Thereafter, when $\alpha$ is larger than 0 and smaller than 1, the cylindrical body 1 is rotated to receive the sunbeams properly.

Figure 5:
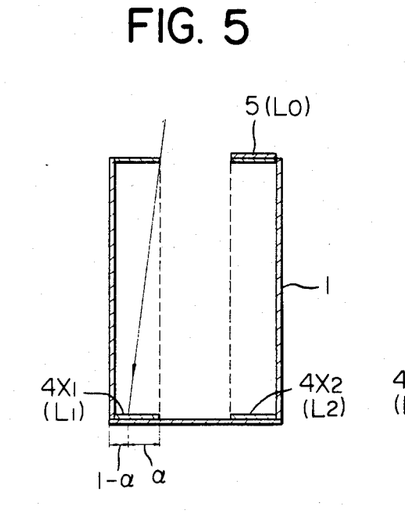
FIGS. 5 to 8 are side-sectional views of a sunlight direction sensor, respectively, according to first to fourth embodiments of the present invention.

The present invention has been made to further improve the conventional technique for calculation of the ratio $\alpha$ described above. According to the conventional method, sensitivity of the photosensor 5 (first photosensor) disposed on the flange 2 may differ from that of the photosensors $4X_1$ (second photosensor) and $4X_2$ (third photosensor) arranged on the flange 3. Further, the amount of sunbeams falling on the photosensor on the flange 2 may differ from that of sunbeams falling on the photosensors on the flange 3. More specifically, the amount of sunbeams incident on the photosensor 5 on the flange 3 is smaller than that of sunbeams incident on the photosensors $4X_1$ and $4X_2$. Therefore, the output signal from the photosensor 5 is smaller than that from the photosensor $4X_1$ or $4X_2$. The output signals from these photosensors do not satisfy relation (5). The present invention has been made to eliminate the drawback of the conventional method. Assume that sunbeams are falling on the entire surface of the second or third sensor $4X_1$ or $4X_2$ and an output signal therefrom is defined as $\overline{L}_1$ and the output signal from the first photosensor 5 is defined as $L_0$. Further, assume that a ratio $\overline{L}_1/L_0$ is defined as $\lambda$, the total amount of sunbeams incident on the flange 2 is $S_0$, the amount of beams incident directly from the sun is defined as D, and the amount of beams incident indirectly from the sun is defined as I, the following relations are given in the conditions shown in FIG. 5:

$$\lambda S_0 = D + I$$

$$\frac{D}{\delta} = \frac{\beta \lambda S_0}{\delta} = \beta \lambda L_0$$

$$\frac{I}{\delta} = (1 - \beta)\lambda \frac{S_0}{\delta} = (1 - \beta)\lambda L_0$$

And, $$L_2 = \frac{I}{\delta} = (1 - \beta)\lambda L_0$$

Therefore, $\lambda L_0 - L_2 = \beta \lambda L_0$ $$L_1 = \frac{\alpha D}{\delta} + (1 - \alpha)\frac{I}{\delta}$$

$$= \alpha\beta\lambda L_0 + (1 - \alpha)(1 - \beta)\lambda L_0$$

$$= \alpha\beta\lambda L_0 + (1 - \alpha)L_2$$

$$= \alpha(\lambda L_0 - L_2) + L_2 - \alpha L_2$$

Therefore, $L_1 - L_2 = \alpha(\lambda L_0 - 2L_2)$ $$\alpha = \frac{L_1 - L_2}{\lambda L_0 - 2L_2}$$

If the ratio $\lambda$ is determined in advance, the ratio $\alpha$ can be accurately determined.

Figure 6:
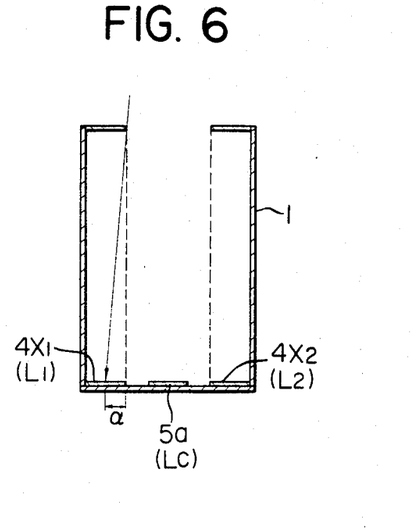

FIG. 6 is a view of a sunlight direction sensor according to a second embodiment of the present invention. The sunlight direction sensor in FIG. 6 is substantially the same as that in FIG. 5 except that the photosensor 5 is disposed at the center of the bottom of the cylindrical body 1 and designated as 5a. The sunlight direction sensor with the above arrangement can obtain the same effects as that in FIG. 5. In other words, the ratio $\alpha$ is determined accurately. If an output from the photosensor 5a is defined as Lc (mV), a correction coefficient between the photosensors 5a and $4X_1$ or $4X_2$ is defined as $\lambda a$, the following relations are given:

$$L_c = \lambda_a \beta L_c + \lambda_a(1 - \beta)L_2$$

And, $$L_2 = \frac{I}{\delta} = \lambda_a(1 - \beta)L_2$$

Therefore, $L_2 = \lambda_a L_c - \lambda_a \beta L_c$ $$\lambda_a \beta L_c = \lambda_a L_c - L_2$$

$$L_1 = \alpha \frac{D}{\beta} + (1 - \alpha)\frac{I}{\delta}$$

$$= \alpha\lambda_a\beta L_c + (1 - \alpha)\lambda_a(1 - \beta)L_c$$

$$= \alpha\lambda_a\beta L_c + (1 - \alpha)L_2$$

$$= \alpha(\lambda_a L_c - L_2) + (1 - \alpha)L_2$$

$$= \alpha\lambda_a L_c - \alpha L_2 + L_2 - \alpha L_2$$

Therefore, $L_1 - L_2 = \alpha(\lambda_a L_c - 2L_2)$ $$\alpha = \frac{L_1 - L_2}{\lambda_a L_c - 2L_2} \quad (0 < \lambda_a \leq 1)$$

Thus, the ratio $\alpha$ is more accurately determined if the correction coefficient $\lambda a$ is determined in advance.

Figure 7:
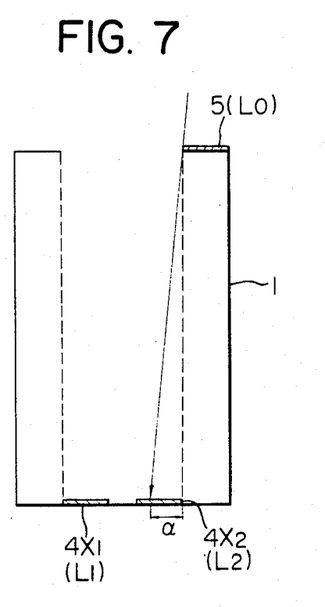

FIG. 7 is a schematic view of a sunlight direction sensor according to a third embodiment of the present invention. The sunlight direction sensor shown in FIG. 7 is substantially the same as that shown in FIG. 5 except that the photosensors $4X_1$ and $4X_2$ are arranged within the luminous flux in the cylindrical body 1. With the above arrangement, the ratio $\alpha$ can be accurately determined. In the same manner as described above, $$\lambda_b S_0 = D + I$$

$$\frac{D}{\delta} = \beta \frac{\lambda_b}{\delta} S_0 = \beta \lambda_b L_0$$

$$\frac{I}{\delta} = (1 - \beta)\lambda_b \frac{S_0}{\delta} = (1 - \beta)\lambda_b L_0$$

And, $$L_1 = \frac{D}{\delta} = \beta \lambda_b L_0$$

$$L_2 = (1 - \alpha)\frac{D}{\delta} + \alpha\frac{I}{\delta}$$

$$= (1 - \alpha)\beta\lambda_b L_0 + \alpha(1 - \beta)\lambda_b L_0$$

$$= (1 - \alpha)\beta\lambda_b L_0 + \alpha\lambda_b L_0 - \alpha\beta\lambda_b L_0$$

$$= (1 - \alpha)L_1 + \alpha\lambda_b L_0 - \alpha L_1$$

$$= L_1 - \alpha L_1 + \alpha\lambda_b L_0 - \alpha L_1$$

$$L_1 - L_2 = \alpha(\beta_b L_0 - 2L_1)$$

$$\alpha = \frac{L_1 - L_2}{2L_1 - \lambda_b L_0} \quad (0 < \lambda_b \leq 1)$$

As is apparent from the above relations, the ratio $\alpha$ is determined accurately.

Figure 8:
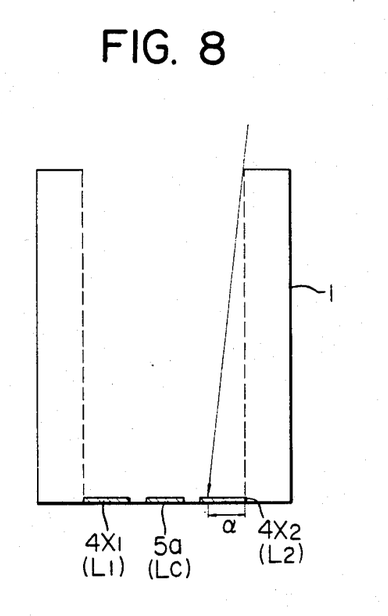

FIG. 8 is a schematic view of a sunlight direction sensor according to a fourth embodiment of the present invention. The sunlight direction sensor shown in FIG. 8 is substantially the same as that shown in FIG. 7 except that the photosensor 5 is disposed at the center of the bottom of the cylindrical body 1 and defined as 5a. According to the fourth embodiment, a correction coefficient between the photosensor 5a and $5X_1$ or $4X_2$ is defined as $\lambda c$ and the total amount of sunbeams within the cylindrical body 1 is defined as Sc. Thus, the following relations are given:

$$S_c = \lambda_c(D + I)$$

$$\frac{D}{\delta} = \beta\lambda_c\frac{S_c}{\delta} = \lambda_c\beta L_c$$

$$\frac{I}{\delta} = (1 - \beta)\lambda_c\frac{S_c}{\delta} = \lambda_c(1 - \beta)L_2$$

And, $$L_1 = \frac{D}{\delta} = \lambda_c\beta\frac{S_c}{\delta} = \lambda_c\beta L_c$$

$$L_2 = (1 - \alpha)\frac{D}{\delta} + \alpha\frac{I}{\delta}$$

$$= (1 - \alpha)\lambda_c\beta L_c + \alpha\lambda_c(1 - \beta)L_c$$

$$= (1 - \alpha)\lambda_c\beta L_c + \alpha\lambda_c L_c - \alpha\lambda_c\beta L_c$$

$$= (1 - \alpha)L_1 + \alpha\lambda_c L_c - \alpha L_1$$

$$= L_1 - 2\alpha L_1 + \alpha\lambda_c L_c$$

Therefore, $L_1 - L_2 = \alpha(2L_1 - \lambda_c L_c)$ $$\alpha = \frac{L_1 - L_2}{2L_1 - \lambda_c L_c}$$

The ratio $\alpha$ can be accurately determined in the same manner as in the previous embodiments.

As is apparent from the above description, the sunlight direction sensor according to the present invention is easily manufactured at low cost and measures the direction of the incident sunbeams accurately.

Figure 9:
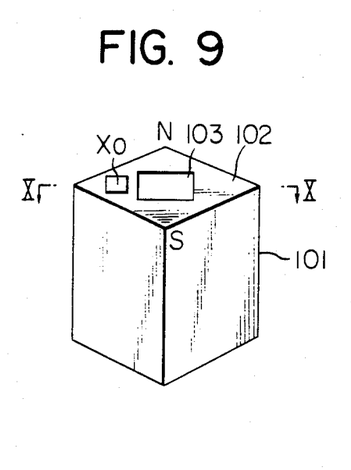
FIG. 9 is a perspective view of a sunlight direction sensor according to a fifth embodiment of the present invention.
Figure 10:
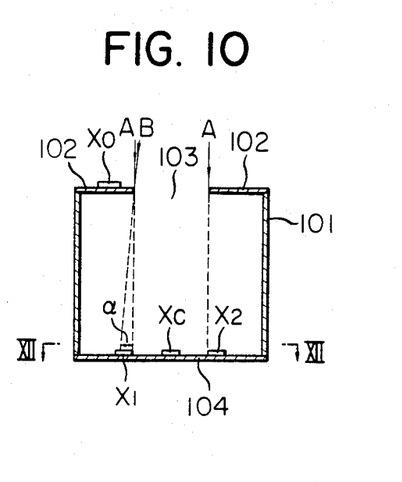
FIG. 10 is a sectional view taken along the line X—X in FIG. 9.
Figure 11:
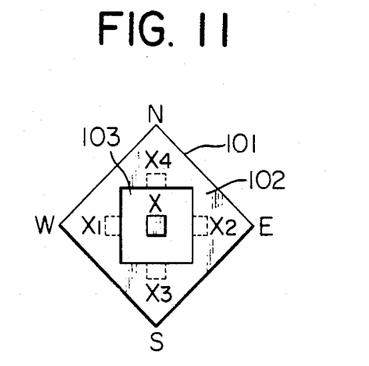
FIG. 11 is a plan view of the sunlight direction sensor shown in FIG. 9.
Figure 12:
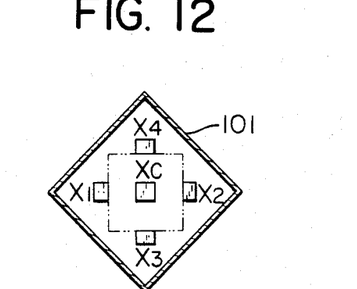
FIG. 12 is a sectional view taken along the line XII—XII in FIG. 10.

FIG. 9 is a perspective view of the overall arrangement of a sunlight direction sensor according to a fifth embodiment of the present invention; FIG. 10 is a sectional view thereof taken along the line X—X in FIG. 9; FIG. 11 is a plan view thereof; and FIG. 12 is a sectional view thereof taken along the line XII—XII in FIG. 10. A flange 102 is formed at the upper end of a prism-shaped or round-shaped cylindrical body 101. Photosensors $X_1$ to $X_4$ are arranged on a bottom plate 104. A photosensor $X_c$ is disposed at the center of the bottom plate 104. A polygonal or circular window 103 is formed at the upper end of the cylindrical body 101.

Figure 13:
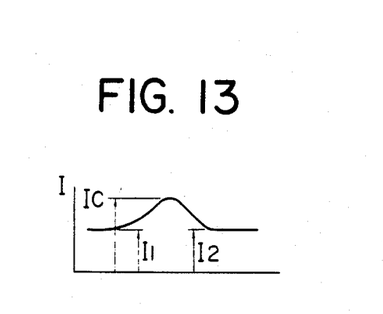
FIG. 13 is a graph illustrating distribution of the indirect sunlight I in a cylindrical body.

The photosensors $X_1$ and $X_2$, and $X_3$ and $X_4$ are symmetrical in respect with the central axis of the cylindrical body 101, respectively. Further, these photosensors are arranged at equal angular intervals with each other, as shown in FIG. 12. Inner edges of the photosensors $X_1$ to $X_4$ correspond to the inner edge of the flange 102. Therefore, if sunbeams perpendicular to the plane of the flange 102 are incident thereon, the photosensors $X_0$ to $X_4$ are on the outerline of the shade 102. When the cylindrical body 101 is accurately oriented toward the sun, that is, when the sunbeams are falling from the direction indicated by arrow A, direct beams D from the sun are not incident on the photosensors $X_1$ to $X_4$ and indirect beams I from the sun are incident thereon. The beams D and I are incident on the photosensor $X_c$. However, when the cylindrical body 101 is deviated from the direction of the sunbeams, that is, when the sunbeams are falling from the direction indicated by arrow B, a part of the photosensor $X_1$ which corresponds to the ratio $\alpha$ receives the beams D and the other part thereof receives the beams I. The photosensor $X_2$ receives only the beams I. More particularly, when the sunbeams which are perpendicular to the plane of the flange 102 are falling on the cylindrical body 101, the same amount of beams are incident on the photosensors $X_1$ and $X_2$ or $X_3$ and $X_4$. However, when the axial direction of the cylindrical body 101 is deviated from the direction of the sunbeams, the amount of beams falling on the photosensor $X_1$ differs from that of beams fallen on the photosensor $X_2$. Thus, if the axial direction of the cylindrical body 101 is aligned with the direction indicated by arrow A, the cylindrical body 101 is orientated toward the sun properly. Therefore, the solar energy collector device which mounts the sunlight direction sensor therein is oriented toward the sun. However, in the cylindrical body 101, the intensity of the beams I is high at the center of the cylindrical body 101 and is low at the outer periphery thereof, as shown in FIG. 13. If the difference between the central intensity and the peripheral intensity of the beams is not compensated for, the orientation of the sunlight direction sensor through which the beams D pass cannot be measured accurately. In other words, the ratio $\alpha$ cannot be accurately determined.

According to the above embodiments, a method is provided wherein an angular deviation of the axis of the cylindrical body of the sunlight direction sensor from the direction of the sunbeams is detected as a numeric value accurately.

Assume that the photosensor $X_0$ is arranged on the flange 102 of the sunlight direction sensor shown in FIGS. 9 to 12. The total amount of sunbeams is defined as $S_0$, the amount of direct beams from the sun is defined as $D_0$, the output signal from the photosensor $X_0$ is defined as $L_0$, a photoelectric conversion coefficient is defined as $\delta_0 (=S_0/L_0)$, and a ratio $D_0/S_0$ is defined as $\beta_0$. The following relations are given:

$$S_0 = \delta_0 L_0 \qquad (101)$$

$$D_0 = \beta_0 S_0 = \beta_0 \delta_0 L_0 \qquad (102)$$

Similarly, the following relations are given for the photosensor $X_c$ as follows:

$$S_c = \delta_c L_c \qquad (103)$$

$$D_c = \beta_c S_c = \beta_c \delta_c L_c \qquad (104)$$

As far as the photosensor $X_1$ is concerned, the following relations are given when the direct beams from the sun are falling on the entire surface of the photosensor $X_1$:

$$\bar{S}_1 = \delta_1 \bar{L}_1 \qquad (105)$$

$$\bar{D}_1 = \beta_1 \bar{S}_1 = \beta_1 \delta_1 \bar{L}_1 \qquad (106)$$

In the above conditions, since the direct beams from the sun are not falling on the photosensor $X_2$, the following relations are given for the photosensor $X_2$.

$$S_2 = \delta_2 L_2 = I_2 \qquad (107)$$

$$D_2 = 0 \qquad (108)$$

where $I_2$ indicates the amount of indirect sunbeams falling on the photosensor $X_2$.

If the direct beams from the sun are falling on part of the photosensor $X_1$, that is, when the edge of the photosensor $X_1$ which is in contact with the outer periphery of the luminous flux is defined as 0 and the ratio $\alpha$ is the width of the luminous flux falling on the photosensor $X_1$ to that of the photosensor $X_1$, a total amount $S_1$ of sunbeams falling on the photosensor $X_1$ is given by the following relation if the ratio $\alpha$ is larger than 0 and less than 1:

$$S_1 = \delta_1 L_1$$

where $L_1$ is the output signal (mV) and $\delta_1$ is the photoelectric conversion coefficient. The direct beams from the sun are only falling on part of the photosensor $X_1$ which corresponds to the ratio $\alpha$. The indirect beams from the sun are incident on the entire surface of the photosensor $X_1$, so the following relation is established:

$$S_1 = \alpha D_1 + I_1 = \alpha D_c + S_2 \qquad (109)$$

where $I_1$ is the total amount of the indirect beams from the sun which are incident on the photosensor $X_1$. This amount is substantially equal to that of indirect beams from the sun which are incident on the photosensor $X_2$, that is, to the total amount of sunbeams $S_2$ incident on the photosensor $X_2$.

When relations (104) and (117) are substituted in relation (109), we obtain:

$$S_1 = \alpha \beta_c \delta_c L_c + \delta_2 L_2 \qquad (110)$$

Since $S_1 = \delta_1 L_1$, relation (110) may be rewritten as:

$$\delta_1 L_1 = \alpha \beta_c \delta_c L_c + \delta_2 L_2 \qquad (111)$$

on the other hand, $$D_c = S_c - I_c \qquad (112)$$

$$\frac{I_2 \text{ (or } I_1)}{I_c} = \lambda \qquad (113)$$

$$(I_2 \approx I_1)$$

Then, relation (112) above may be rewritten as:

$$D_c = S_c - \frac{I_2}{\lambda} \qquad (114)$$

-continued

Thus, $$\delta_c \beta_c L_c = \delta_c L_c - \frac{\delta_2 L_2}{\lambda} \quad (115)$$

Substitution of relation (115) in relation (111) results in:

$$\delta_1 L_1 = \alpha \left( \delta_c L_c - \frac{\delta L_2}{\lambda} \right) + \delta_2 L_2 \quad (116)$$

Thus, $$\alpha = \frac{\delta_1 L_1 - \delta_2 L_2}{\delta_c L_c - \frac{\delta_2 L_2}{\lambda}} \quad (117)$$

If the shape and size of the cylindrical body 1 are determined, the relative distribution of the indirectly fallen sunbeams which are incident on the cylindrical body 1 is uniform. Therefore, $I_c$ and $I_2$ are measured to obtain $I_2/I_2 = \lambda$ which is regarded as a constant. Thus, the ratio $\alpha$ is accurately determined by only the output signals from the photosensors.

Figure 14:
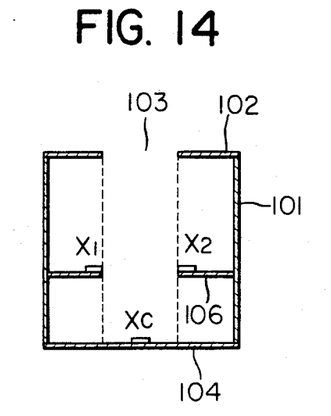
FIGS. 14 and 15 are side-sectional views of sunlight direction sensors according to sixth and seventh embodiments of the present invention.

FIG. 14 is a side-sectional view of a sunlight direction sensor according to a sixth embodiment of the present invention. A second flange 106 having a small window 105 which is equal to or larger than the window 103 of the flange 102 is disposed at the intermediate portion of the cylindrical body 101. The photosensors $X_1$ to $X_4$ are arranged on the flange 106 and the sensor $X_c$ is disposed at the center of the inner bottom surface of the cylindrical body 101. With the above arrangement, the amount of indirectly radiated sunbeams incident on the photosensor $X_c$ is equal to that of indirectly radiated sunbeams incident on the photosensors $X_1$ to $X_4$ becomes 1 in relation (113). Thus, relation (117) is expressed as follows:

$$\alpha = (\delta_1 L_1 - \delta_2 L_2)/(\delta_c L_c - \delta_2 L_2) \quad (118)$$

Without measuring $\lambda$ in advance, the ratio $\alpha$ can be measured only by the output signals from the photosensors.

Figure 15:
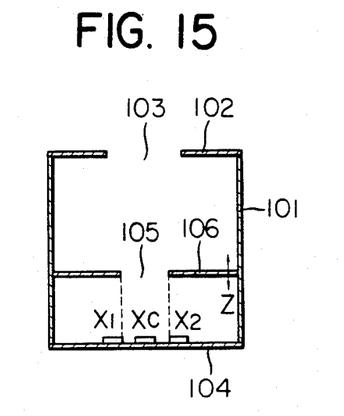

FIG. 15 is a sectional view of a sunlight direction sensor according to a seventh embodiment of the present invention. The second flange 106 is formed at the intermediate portion of the cylindrical body 101 in the same manner as in FIG. 14. The photosensors $X_1$ to $X_4$ and $X_c$ are arranged on the inner bottom surface of the cylindrical body 101. The inner edges of the photosensors $X_1$ to $X_4$ correspond to the inner periphery of the second flange 106. With the above arrangement, the indirect sunbeams are further uniformly incident on the photosensors $X_1$ to $X_4$ and $X_c$, satisfying relation (118).

Referring to FIG. 15, if the second flange 106 is axially movable along the cylindrical body 101 as indicated by arrow Z, outputs from the photosensors can be arbitrarily controlled. Especially, in the sunlight direction sensor shown in FIG. 15, since photosensors are not arranged on the second flange 106, connections of lead wires of the photosensors may not be considered, resulting in convenience.

If a ratio $\delta_c/\delta_1$ of the sensitivity ($1/\delta_c$) of the photosensor $X_c$ on which the direct sunbeams are incident to the sensitivity ($1/\delta_1$) of the photosensor $X_1$ ($X_2$, $X_3$ or $X_4$) is determined as 5 in humid areas and 10 in the dry areas in normal operation in consideration of the ratio $(1-\beta_0)$ of average of indirectly fallen sunbeams, the intensity of the sunbeams does not influence the measurement greatly and the measuring range by the photosensors is determined to be optimal.

However, according to the sunlight direction sensors of the fifth, sixth and seventh embodiments of the present invention shown in FIGS. 9 to 12, 14 and 15, respectively, the sunbeams are instantaneously dispersed when the sun is hidden behind the clouds. The dispersed sunbeams become nonuniformly incident on the photosensors $X_1$ to $X_4$ with a time lag. As a result, the solar energy collector device is quickly controlled by the unbalanced outputs from the photosensors, resulting in overhunting.

Figure 16:
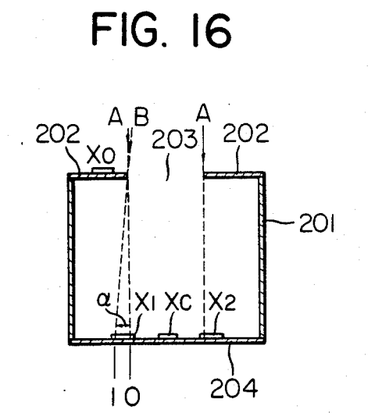
FIG. 16 is a side-sectional view of a sunlight direction sensor according to an eighth embodiment of the present invention.
Figure 17:
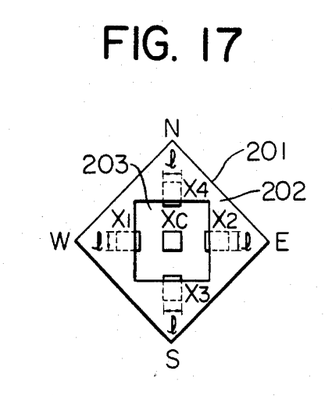
FIG. 17 is a plan view of the sunlight direction sensor shown in FIG. 16.

In order to solve the problem described above, a sunlight direction sensor according to an eighth embodiment of the present invention is described with reference to FIGS. 16 and 17. FIG. 16 is a side-sectional view of the sunlight direction sensor and FIG. 17 is a plan view thereof. The photosensors $X_1$ to $X_4$ are arranged so that the line perpendicular to the plane of a flange 202 are depending from the inner periphery of a window 203 corresponds to intermediate portions (edge portions of the photosensors in the embodiment shown in FIGS. 9 to 12) of the photosensors $X_1$ to $X_4$. Since the edges of the photosensors can hardly match the line which is perpendicular to the plane of the flange 102 and at the inner periphery of the flange 102 and further since the inner edges of the photosensors can hardly be finished linearly and the inner edges of the photosensors are on the boundary to determine the presence or absence of the directly fallen sunbeams, the operation point of the photosensors is unstable. In the above embodiment, the line perpendicular to the plane of the window 203 depending from its inner periphery may correspond to any intermediate point on the photosensors $X_1$ to $X_4$. The accuracy of measurement is independently of unstable material conditions. Only if a width 1 of the sensors $X_1$ to $X_4$ need be finished with high precision. Thus, with simple construction, unstable operation such as hunting can be eliminated. Referring to FIG. 16, the position on the photosensor which matches the line perpendicular to the plane of the window 203 is defined as 0. The boundary for determining the presence or absence of directly radiated sunbeams is located on the intermediate points of the photosensors $X_1$ to $X_4$, respectively. The output signals from the photosensors are linearly changed upon movement of the boundary, respectively. Further, since an output from the photosensor on which the directly fallen sunbeams are incident is biased, the sunlight direction sensor is not influenced by an external disturbance greatly. Therefore, the N/S ratio and linearity of the output of the photosensors are improved greatly, resulting in easy controllability.

What is claimed is:

1. A sunlight direction sensor comprising a cylindrical body, a nontransparent flange disposed at an upper end of said cylindrical body and having an inner diameter smaller than an inner diameter of said cylindrical body, a first photosensor which is arranged on said nontransparent flange, and at least one pair of second and third photosensors which are symmetrically arranged at a lower end of said cylindrical body so that inner edges of said second and third photosensors correspond to an inner periphery of said flange, wherein a ratio α of a width of a luminous flux falling incident on said second or third photosensor to an overall width thereof is given as follows, said width being measured from the inner edge of the corresponding sensor:

$$\alpha = (L_1 - L_2)/(\lambda L_0 - 2L_2)$$

where $L_0$ (mV) is an output signal generated in response to a total amount of luminous flux incident on said first sensor, $L_1$ (mV) is an output signal generated in response to an amount of direct and indirect luminous flux incident on said second photosensor, $L_2$ (mV) is an output signal generated in response to an amount of indirect luminous flux incident on said third photosensor, and λ is the ratio of the output signal from said first photosensor to the output signal from said second photosensor when luminous flux is incident on the entire surfaces of said first photosensor and said second photosensor.

2. A sunlight direction sensor comprising a cylindrical body, a nontransparent flange disposed at an upper end of said cylindrical body and having an inner diameter smaller than an inner diameter of said cylindrical body, a first photosensor disposed at a substantially center of an inner bottom surface of said cylindrical body, and at least one pair of each of second and third photosensors which are arranged on the inner bottom surface of said cylindrical body, said second and third photosensors being positioned symmetrically with respect to an axis of said cylindrical body, so that inner edges thereof correspond to an inner periphery of said flange, wherein a ratio of a width of a luminous flux incident on said second or third photosensor to an overall width of said second or third photosensor is defined as follows, said width being measured from the inner edge of the corresponding sensor:

$$\alpha = (L_1 - L_2)/(\lambda_a L_c - 2L_c)$$

where $L_c$ (mV) is an output signal generated in response to a total amount of luminous flux incident on said first sensor, $L_1$ (mV) is an output signal generated in response to an amount of direct and indirect luminous flux incident on said second or third photosensor, $L_2$ (mV) is an output signal generated in response to an amount of indirect luminous flux incident on said third or second photosensor, and $\lambda_a$ is the ratio of the output signal from said first photosensor to the output signal from said second or third photosensor when the luminous flux is incident on entire surfaces of said first photosensor and second or third photosensor.

3. A sunlight direction sensor comprising a cylindrical body, a nontransparent flange disposed at an upper end of said cylindrical body and having an inner diameter smaller than an inner diameter of said cylindrical body, a first photosensor disposed on said nontransparent flange, and at least one pair of each of second and third photosensors which are arranged on the inner bottom surface of said cylindrical body, said second and third photosensors being positioned symmetrically with respect to an axis of said cylindrical body, so that outer edges thereof correspond to an inner periphery of said flange, wherein a ratio α of a width of a luminous flux incident on said second or third photosensor to an overall width of said second or third photosensor is defined as follows, said width being measured from the inner edge of the corresponding sensor:

$$\alpha = (L_1 - L_2)/(2L_1 - \lambda_b L_0)$$

where $L_0$ (mV) is an output signal generated in response to a total amount of luminous flux incident on said first photosensor, $L_1$ (mV) is an output signal generated in response to an amount of direct and indirect luminous flux incident on said second or third photosensor, $L_2$ (mV) is an output signal generated in response to an amount of indirect luminous flux incident on said third or second photosensor, and $\lambda_b$ is the ratio of the output signal from said first photosensor to the output signal from said second or third photosensor when the luminous flux is incident on entire surfaces of said first photosensor and said second or third photosensor.

4. A sunlight direction sensor comprising a cylindrical body, a nontransparent flange disposed at an upper end of said cylindrical body and having an inner diameter smaller than an inner diameter of said cylindrical body, a first photosensor disposed on said nontransparent flange, and at least one pair of each of second and third photosensors which are arranged on the inner bottom surface of said cylindrical body, said second and third photosensors being positioned symmetrically with respect to an axis of said cylindrical body, so that outer edges thereof correspond to an inner periphery of said flange, wherein a ratio α of a width of a luminous flux incident on said second or third photosensor to an overall width of said second or third photosensor is defined as follows, said width being measured from the outer edge of the corresponding sensor:

$$\alpha = (L_1 - L_2)/(2L_1 - \lambda_c L_c)$$

where $L_0$ (mV) is an output signal generated in response to a total amount of luminous flux incident on said first photosensor, $L_1$ (mV) is an output signal generated in response to an amount of direct and indirect luminous flux incident on said second or third photosensor, $L_2$ (mV) is an output signal generated in response to an amount of indirect luminous flux incidnet on said third or second photosensor, and $\lambda_c$ is the ratio of the output signal from said first photosensor to the output signal from said second or third photosensor when the luminous flux is incident on entire surfaces of said first photosensor and said second or third photosensor.

5. A sunlight direction sensor comprising a parallelepiped, a nontransparent sensor disposed on an upper end of said parallelepiped and having a small polygonal window, diagonals of which are smaller than an inner diagonal of said parallelepiped, a first photosensor arranged at substantially the center of an inner bottom surface of said parallelepiped, and at least one pair of each of second and third photosensors which are disposed at said inner bottom surface, said second and third photosensors being arranged symmetrically with respect to an axis of said parallelepiped, so that inner edges thereof correspond to an inner periphery of said flange defining said window, wherein a ratio α of a width of a luminous flux incident on said second or third photosensor to an overall width of said second second or third photosensor is defined as follows, said width being measured from the inner edge of the corresponding sensor:

$$\alpha = (\delta_1 L_1 - \delta_2 L_2)/[\delta_c L_c - (\delta_2 L_2/\lambda)]$$

where $\delta_c$ is a photoelectric conversion coefficient of said first photosensor, $L_c$ (mV) is an output signal from said first photosensor, $\delta_1$ is the photoelectric conversion coefficient of said second or third photosensor, $L_1$ (mV) is an output signal from said second or third photosensor, $\delta_2$ is the photoelectric conversion coefficient of said third or second photosensor, and $L_2$ (mV) is an output signal from said third or second photosensor, and $\lambda$ is given by a corresponding one of the following relations:

$$\lambda = I_1/I_c \text{ and } \lambda = I_2/I_c$$

where $I_c$ is an amount of indirect luminous flux incident on said first photosensor, $I_1$ is an amount of indirect luminous flux incident on said second or third photosensor, and $I_2$ is an amount of indirect luminous flux incident on said third or second photosensor.

6. A sensor according to claim 5 wherein a ratio $\delta_c/\delta_1$ and a ratio $\delta_c/\delta_2$ are selected to be in the range of 5 to 10.

7. A sunlight direction sensor comprising a parallelepiped, a first nontransparent flange disposed at an upper end of said parallelepiped and having a window with a diagonal smaller than an inner diagonal of said parallelepiped, a second nontransparent flange disposed at an intermediate portion of said parallelepiped axially displaced from said first nontransparent flange, and having a window with a diagonal smaller than an inner diagonal of said parallelepiped, first photosensor disposed substantially at a center of an inner bottom surface of said parallelepiped, and at least one pair of second and third photosensors which are disposed on said second nontransparent flange and arranged symmetrically with respect to an axis of said parallelepiped, inner edges of said second and third photosensors corresponding to an inner periphery of said first nontransparent flange defining said window, wherein a ratio $\alpha$ of a width of a luminous flux falling on said second or third photosensor to an overall length of said second or third photosensor is defined as follows said width being measured from the inner edge of the corresponding sensor:

$$\alpha = (\delta_1 L_1 - \delta_2 L_2)/[\delta_c L_c - (\delta_2 L_2)]$$

where $\delta_c$ is a photoelectric conversion coefficient of said first photosensor, $L_c$ (mV) is an output signal from said first photosensor, $\delta_1$ is the photoelectric conversion coefficient of said second or third photosensor, $L_1$ (mV) is an output signal from said second or third photosensor, $\delta_2$ is the photoelectric conversion coefficient of said third or second photosensor, and $L_2$ (mV) is an output signal from said third or second photosensor.

8. A sensor according to claim 7 wherein a ratio $\delta_c/\delta_1$ and a ratio $\delta_c/\delta_2$ are selected to be in the range of 5 to 10.

* * * * *